United States Patent [19]
Maeda

[11] Patent Number: 5,406,420
[45] Date of Patent: Apr. 11, 1995

[54] OPTICAL DEVICE
[75] Inventor: Yoshinobu Maeda, Yokkaichi, Japan
[73] Assignee: Research Development Corporation of Japan, Tokyo, Japan
[21] Appl. No.: 43,791
[22] Filed: Apr. 7, 1993
[51] Int. Cl.[6] .................................................. G02B 5/22
[52] U.S. Cl. ..................... 359/885; 359/888; 359/578; 359/583; 359/589; 250/227.23
[58] Field of Search .................. 359/885–887, 359/888, 350, 353, 361, 578, 583, 589; 250/226, 227.23; 372/32

[56] References Cited
U.S. PATENT DOCUMENTS

| | | | |
|---|---|---|---|
| 4,590,374 | 5/1986 | Brewster | 359/589 |
| 4,874,223 | 10/1989 | O'Meara | 359/578 |
| 4,962,503 | 10/1990 | Liu et al. | 372/32 |
| 4,962,995 | 10/1990 | Andrews et al. | 385/123 |
| 4,995,046 | 2/1991 | Fan et al. | 372/41 |

Primary Examiner—Loha Ben
Assistant Examiner—Thomas Robbins
Attorney, Agent, or Firm—Wenderoth, Lind & Ponack

[57] ABSTRACT

An optical controlling device has a light transmitting medium showing a low transmittance for specific light wavelength $\lambda_1$ and a high transmittance for light wavelength $\lambda_2$ around the light wavelength $\lambda_1$, and a light emitting device emitting a light of light wavelength $\lambda_1$ or $\lambda_2$, and controls light intensity in accordance with changes in a controlled light through light irradiation and light transmission. An optical functional device has a light transmitting medium showing a low transmittance for specific light wavelength $\lambda_1$ and a high transmittance for light wavelengths $\lambda_2$ and $\lambda_3$ around the wavelength $\lambda_1$ ($\lambda_2 < \lambda_1 < \lambda_3$), and a light emitting device changing wavelength while accompanying a generation of hysteresis dependent upon the quantity of current injection or light irradiation, and emitting a light having light wavelength $\lambda_1$, $\lambda_2$ or $\lambda_3$. A light intensity transmitting through the light transmitting medium is maintained at a low-intensity or high-intensity state under the effect of the hysteresis, thereby a memory function is obtained.

18 Claims, 17 Drawing Sheets

Fig. 9
(a)
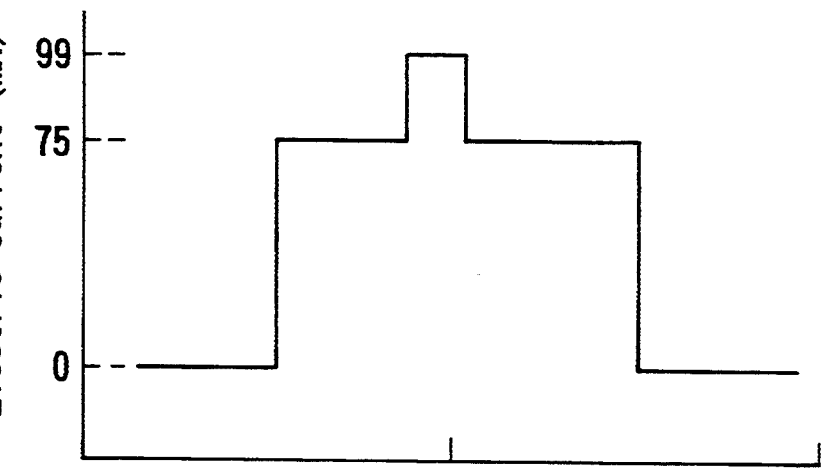
Fig. 9
(b)
Fig. 9
(c)
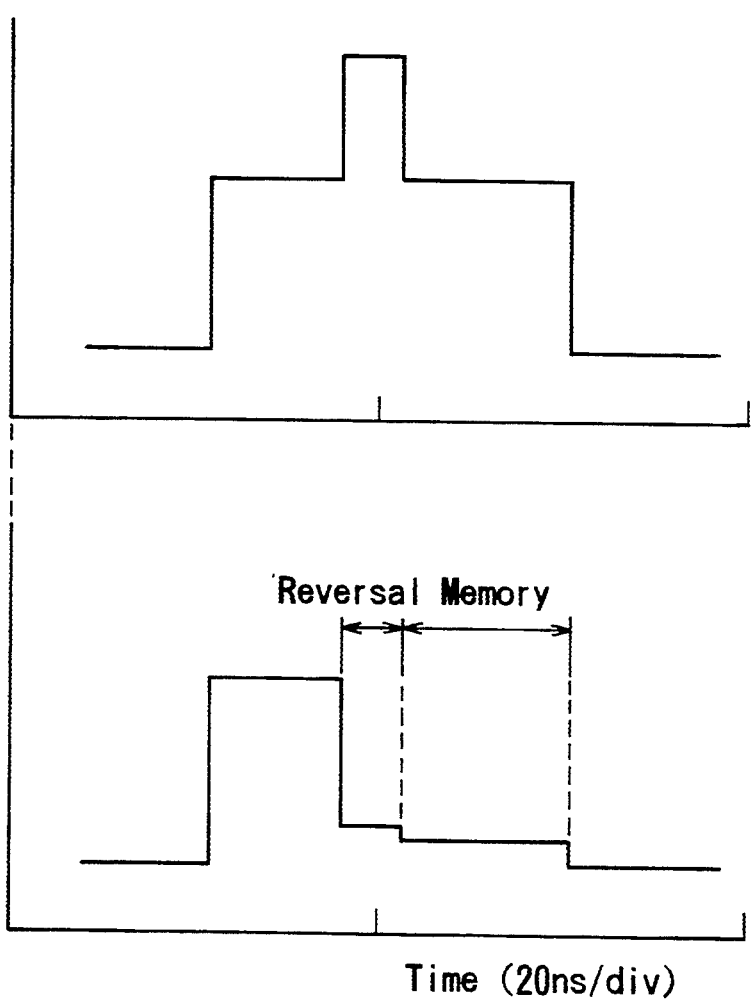
Time (20ns/div)

Fig. 1 1 (a)
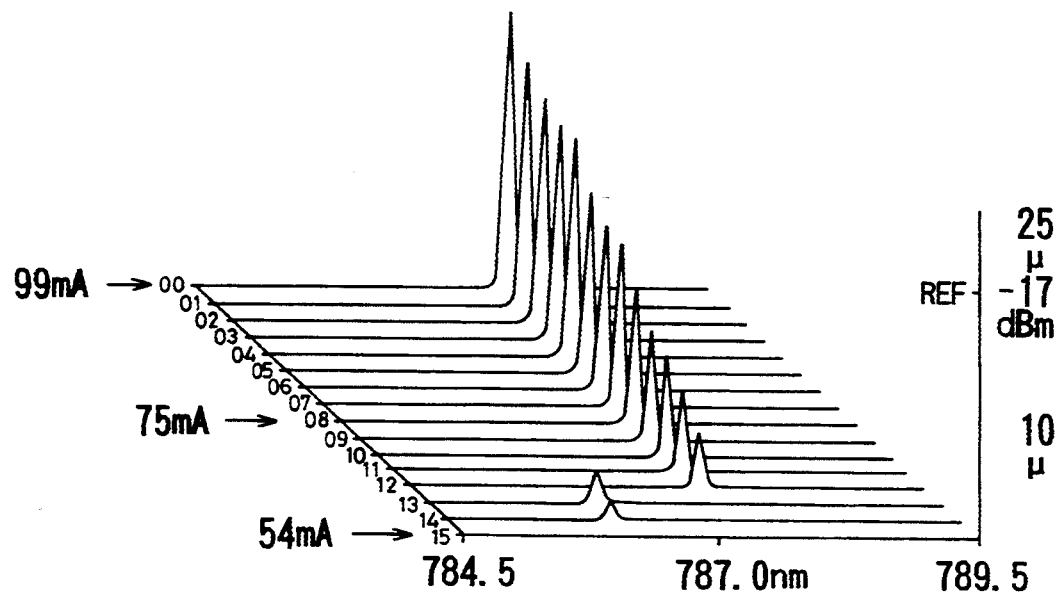
Fig. 1 1 (b)
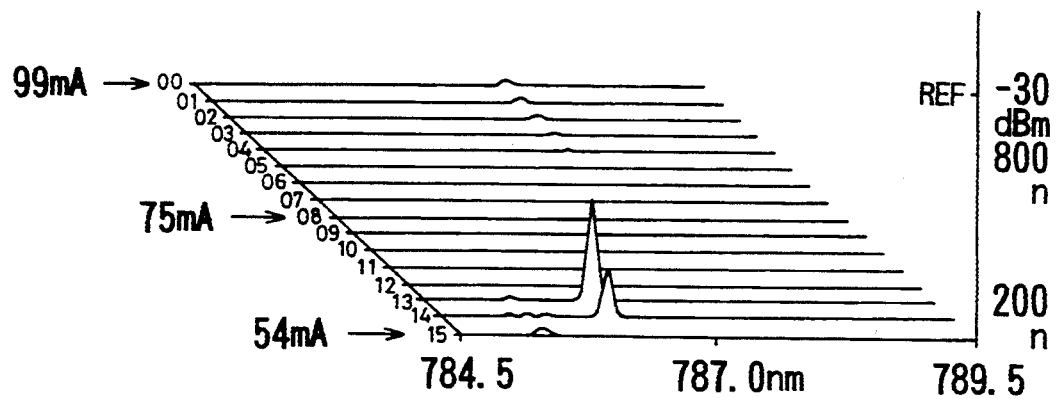

(a)

(b)

(c)

Fig. 1 5 (a)
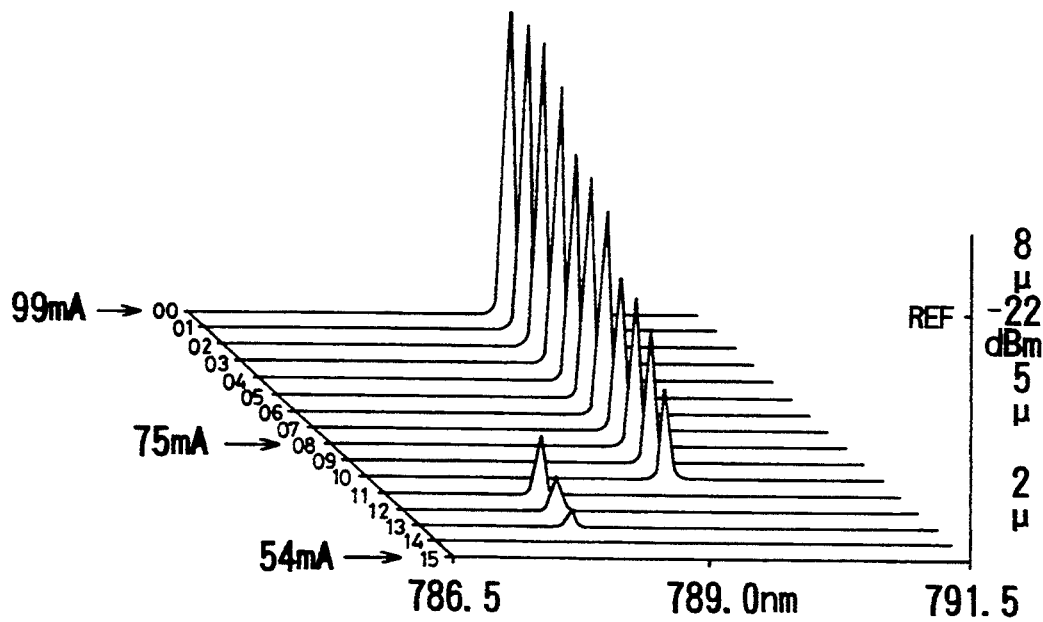
Fig. 1 5 (b)
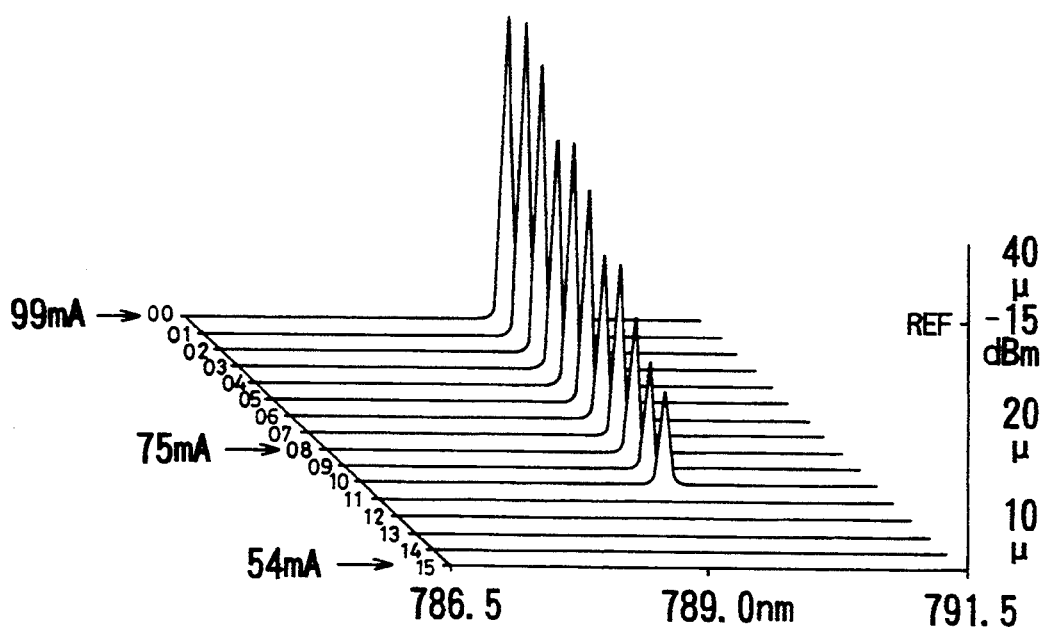

1.00 ns/div 1.00 ns/div

OPTICAL DEVICE

FIELD OF THE INVENTION

The present invention relates to an optical device. More particularly, the present invention relates to an optical controlling device useful for a photo inverter and an optical functional device useful for an optical memory, both of which are indispensable for optical logical calculations and light computing in the photoelectronic field.

PRIOR ART

Photoelectronic technology has recently made a remarkable progress and is becoming a more important fundamental technology for optical communication, optical computers and the like.

Under these circumstances, an optical control method for performing logical calculations of a computer by means of optical signals has been studied as one of the control techniques for utilizing light.

In the photoelectronics field including optical communication and optical information processing, for example, some research is made on a control of a controlled light by a controlling light. According to this method, it is possible to achieve a switching operation higher in speed than that of an electrical switching circuit. It also permits multiple parallel processing operations by using an imaging ability of a light. The method is, therefore, considered to be useful in the optical integrated circuit, for example.

An optical device using nonlinear optical effects is, on the other hand, studied for the purpose of an optical control. While wavelength conversion effect such as a generation of a second higher harmonic has conventionally been considered to be important for practical use, general attention is now particularly directed toward an alteration of refractive index dependent on the light intensity and a change of absorption coefficient (Applied Physics, 59, 155–163 (February 1990)). However, since these effects take place in a tertiary polarization, a nonlinear optical material having a higher-order polarization effect is required ["Degenerate fourwave mixing in semiconductor-doped glasses," J. Opt. Soc. Am., 73, 647–653 (May 1983)]. Although an absorption-saturated type bistable semiconductor laser is considered to be most useful for a semiconductor optical control device, an optical input is employed for switchover from off-state to on-state, whereas a negative optical pulse does not exist for switchover from on-state to off-state (NOT circuit). Therefore, the bistable semiconductor laser has not been practically used (Applied Physics, 58, 1574–1583 (November 1989)). The words "optical bistability" described herein mean a phenomenon in which two stable states of output intensity are available for a single light intensity.

An optical memory is, on the other hand, becoming essential, which stores optical signal information. The optical memory refers to a memory using a light when writing and reading information. In a wide sense, however, it includes a memory using a light for either.

Although such an optical memory is generally recognized to be important, only an analog imaging memory is currently utilized, and many others are still in the stage of research. There are a holographic memory, a photomagnetic memory and a glass semiconductor memory which are considered to be more available among those. The holographic memory is a photograph of the optical interference given by a laser beam. This memory is, however, defective in that, while it allows a high-speed reading, it requires the writing and developing operations.

The photomagnetic memory is a memory which allows writing of information by irradiating a laser beam to a ferromagnetic material such as MnBi and reading of the information by employing a Faraday effect in which polarization of a transmitting light is generated dependent upon the magnetization state. It is, however, defective in that light and magnetism are employed in parallel.

The glass semiconductor memory is a memory which permits writing and reading of information by using a phenomenon in which the irradiation of a laser beam having an appropriate intensity to the glass semiconductor leads to a reversible phase transfer between polycrystalline and non-crystalline states, and transmittance is changed. It has, however, problems in that the switching speed of phase transfer is slow.

On the other hand, some researche has been performed in which an optical memory is designed by the bistable semiconductor laser. This type of the memory, however, has not yet been practically attained because of similar problems mentioned in the above.

Generally, it is also known that a high-speed pulsation of the semiconductor laser produces relaxation oscillation in the intensity of the emitted light. This relaxation oscillation is observed in almost all kinds of laser, and the basic physical mechanism of this phenomenon is an interactive function between the electromagnetic field oscillated in the oscillator and the reversal distribution of atoms. An increase of the field intensity leads to a decrease of the reversal distribution density through an increase in induced emission factor. This, in turn, brings about a decrease in gain and then a decrease in the field intensity.

Although the semiconductor laser instantaneously rises up upon a fast-rising driving current, light intensity usually varies by about 1 nsec under the subsequent relaxation oscillation until a certain value is reached. The pulse response speed is, therefore, limited to about 1 nsec on the maximum, and some studies are performed to control the relaxation oscillation.

An external light injection method is well-known in which a light is injected into a semiconductor laser conducting a direct modulation from another laser working in conjuction therewith. The external light injection suppresses relaxation oscillation (R. Lang and K. Kobayashi: Suppression of the relaxation oscillation in the modulated output of semiconductor lasers, IEEE J. Quantum Electron., QE-12, 3, 194–199 (1976)). However, this method is defective in that two lasers are needed and the oscillating axis modes thereof must be in correspondence with each other.

The present invention has an object to provide an optical device indispensable for carrying out optical logical calculations and optical computing in the photoelectronic field.

More particularly, an object of the present invention is to provide an optical controlling device which allows switching of an optical signal from on-state to off-state, i.e., an optical NOT circuit, and permits full-optical logical calculations.

Another object of the present invention is to provide an optical functional device which stores optical signal information through an electrical or optical input.

This and other objects, features and advantages of the invention will become more apparent upon reading of the following detailed specification and drawings.

BRIEF DESCRIPTION OF THE DRAWINGS

FIGS. 9a, 9b and 9c are respectively correlation diagrams illustrating the injected current to a semiconductor laser device, the light intensity of the output light and the light intensity after transmission through a light transmitting medium;

FIGS. 11a and 11b are respectively correlation diagrams between light wavelength and intensity when decreasing the injected current;

FIGS. 15a and 15b are respectively correlation diagrams between light wavelength and intensity when decreasing the injected current;

DETAILED DESCRIPTION OF THE INVENTION

Figure 1:
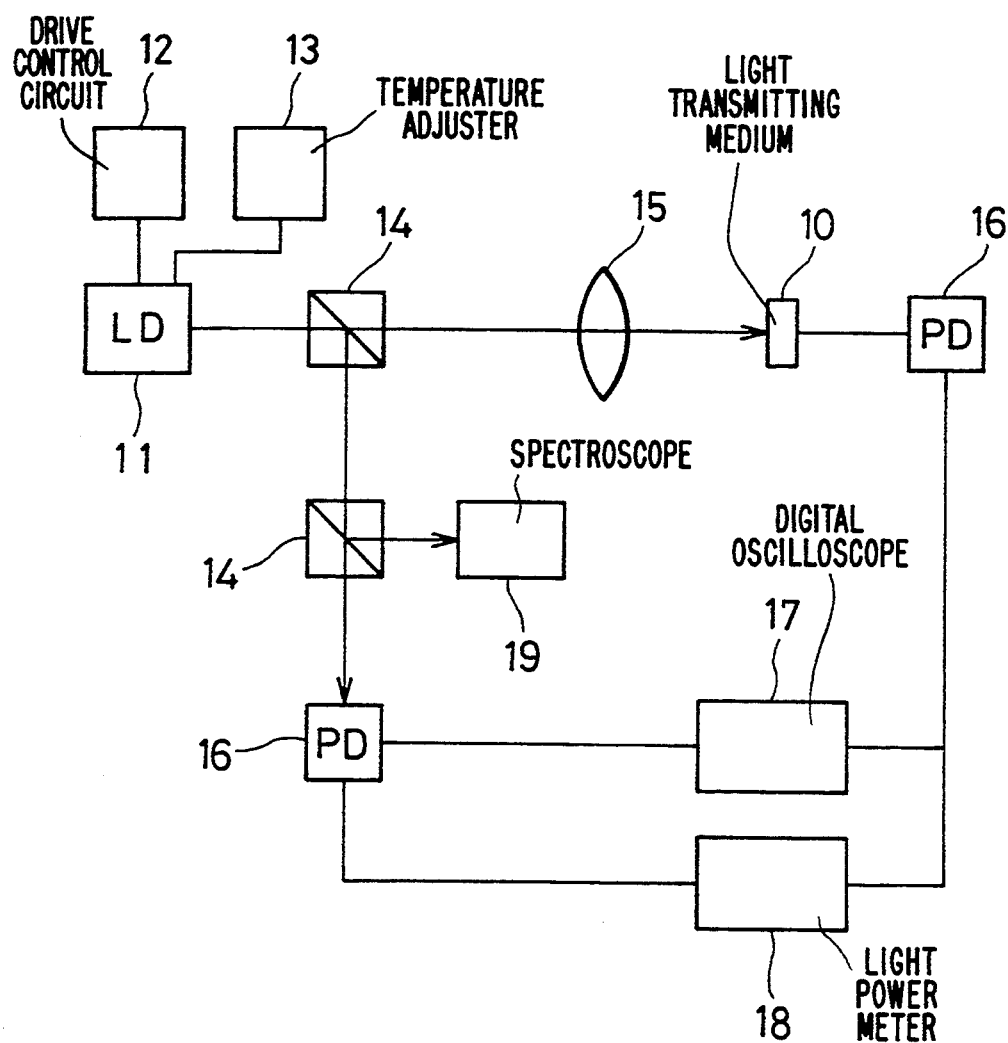
FIG. 1 is a block diagram illustrating an embodiment of the optical controlling device and the device for measuring its functions.

The present invention provides an optical controlling device which comprises a light transmitting medium showing a low transmittance for specific light wavelength $\lambda_1$ and a high transmittance for light wavelength $\lambda_2$ around the wavelength $\lambda_1$, and a light emitting device emitting a light having light wavelength $\lambda_1$ or $\lambda_2$, wherein the optical controlling device controls light intensity in accordance with changes in a controlled light through light irradiation of the controlled light having wavelength $\lambda_1$ or $\lambda_2$ from the light emitting device and light transmission of the controlled light through the light transmitting medium.

A light emitting device of the optical controlling device emits a light of either light wavelength $\lambda_1$ or $\lambda_2$ by applying an external electrical or optical controlling input. The transmittance of a light transmitting medium is controlled by means of the controlled light.

In the present invention, light properties of the light transmitting medium are controlled for accomplishing the light control, and a specific element including, for example, a rare earth element is added to an appropriate material such as transparent ceramics, a glass, a semiconductor or an insulator. A rare earth element optically shows the inner shell transition so that it is hardly affected by the base material. By adding this rare earth element as a doping element to the light transmitting medium, it is possible to generate a ground absorption from the ground level $E_1$ to the excited level $E_3$ and an excited absorption from the metastable level $E_2$ to the excited level $E_4$ for the light of $\lambda_1$ ($E_4 > E_2 > E_3 > E_1$). Therefore, the transmittance at light wavelength $\lambda_1$ is considerably reduced.

On the other hand, when a controlling input is electrically or optically entered in the light emitting device, the emitted wavelength varies from $\lambda_1$ to $\lambda_2$, or from $\lambda_2$ to $\lambda_1$. For example, it is generally known that, when using a semiconductor laser as a light emitting device, the emitted wavelength discontinuously varies toward longer wavelength, as the quantity of the injected current increases (M. Nakamura, "Single mode operation of semiconductor injection lasers," IEEE Trons. Circuits and Systems, CAS-26, 1055 (1979)). If oscillated wavelength varies from $\lambda_2$ to $\lambda_1$ when the injected current to the semiconductor laser is increased, the light intensity of $\lambda_1$ becomes bigger than that of $\lambda_2$ because of the larger quantity of the injection. However, when the output of the semiconductor laser is irradiated to the above-mentioned light transmitting medium, light output of $\lambda_1$ becomes smaller than that of $\lambda_2$ because the transmittance of light wavelength $\lambda_1$ is lower than that of $A_2$, thus achieving an optical NOT circuit.

In the present invention, since the light transmitting medium exhibits a low transmittance for light wavelength $\lambda_1$ and a high transmittance for $A_2$, respectively, a light having light wavelength $\lambda_1$ is absorbed when the light is entered in the light transmitting medium, thus the off-state being achieved. The on-state is given by transmission of a light having light wavelength $\lambda_2$ when the light is entered. Further, since it is possible to dope an element which generates the excited absorption for the light of wavelength $\lambda_1$, the excited absorption which has a higher degree of absorption than the ground absorption takes place, and as a result, the transmittance of $\lambda_1$ transmitting through the light transmitting medium is considerably reduced according to the excited absorption. The difference of the transmittance between the light of $\lambda_1$ and the one of $\lambda_2$ each of which transmits through the light transmitting medium becomes remarkable, thus obtaining an optical inverter (NOT circuit) having a large ratio ON/OFF. Combining a plurality of the optical inverters enables the formation of any logical circuit (NOR, XOR, for example). It is thus possible to achieve optical logical calculations and optical computers by using the optical controlling device of the present invention as a key device.

The present invention also provides an optical functional device which comprises a light transmitting medium showing a low transmittance for specific light wavelength $\lambda_1$ and a high transmittance for light wavelengths $\lambda_2$ and $\lambda_3$ around the wavelength $\lambda_1$ ($\lambda_2 < \lambda_1 < \lambda_3$), and a light emitting device changing wavelength while accompanying a generation of hysteresis dependent upon the quantity of current injection or light irradiation, and emitting a light having light wavelength $\lambda_1$, $\lambda_2$ or $\lambda_3$, wherein a light of wavelength $\lambda_1$, $\lambda_2$ or $\lambda_3$ is irradiated from the light emitting device to the light transmitting medium, the intensity of the light transmitting through the light transmitting medium is maintained at a low or high state under the effect of the hysteresis, thereby a memory function is obtained.

A light emitting device in this optical functional device emits a controlled light of either light wavelength $\lambda_1$, $\lambda_2$ or $\lambda_3$ through entering an electrical or optical controlling input. The transmittance of the light transmitting medium is controlled by the controlled light and the intensity of the light transmitting through the light transmitting medium is maintained at a low or high state because the change of wavelength has hysteresis against the controlling input. And then, a memory function is realized.

In the present invention, optical properties of the light transmitting medium are controlled as in the case of the above-mentioned optical controlling device, and a specific element such as a rare earth element is added to an appropriate material such as transparent ceramics, a glass, a semiconductor or an insulator. Consequently, the light transmitting medium exhibits a low transmittance for light wavelength $\lambda_1$ and a high transmittance for light wavelengths $\lambda_2$ and $\lambda_3$. When a light of wavelength $\lambda_1$ is entered into this light transmitting medium, the light is absorbed to give the off-state, and the entry of a light of wavelength $\lambda_2$ or $\lambda_3$ realizes the on-state through the transmission of the light. Further, since wavelength change from $\lambda_2$ to $\lambda_1$, or from $\lambda_1$ to $\lambda_3$ has hysteresis against the controlling input, the off-state and the on-state are maintained.

On the other hand, when the controlling input is electrically or optically entered in the light emitting device, the emitted wavelength varies from $\lambda_2$ to $\lambda_1$, or from $\lambda_1$ to $\lambda_3$. It is generally known that, when a semiconductor laser is used as a light emitting device, decrease of the amount of the current injection from the large quantity state produces a discontinuous change in the oscillated wavelength toward the short wavelength side while accompanying hysteresis (M. Nakamura, "Single mode operation of semiconductor injection lasers," IEEE Trons. Circuits and Systems, CAS-26, 1055 (1979)). When a current is increased from a low injection state to a high state in that semiconductor laser, oscillated wavelength is changed from $\lambda_2$ to $\lambda_1$, and then the low injection state is resumed, the oscillated wavelength $\lambda_1$ is maintained and the low transmittance state (i.e., off-state) is also maintained even at the recovered low injection state. This is because the oscillated wavelength has hysteresis against the injected current. Similarly, when oscillated wavelengths $\lambda_1$ and $\lambda_3$ are respectively produced at the low and high injection states, the oscillated wavelength $\lambda_3$ is maintained and the high transmittance state (i.e., on-state) is also maintained even at the returned low injection. This permits achievement of a memory function.

By using this memory function, it is possible to eliminate the harm of relaxation oscillation which is one of the causes of deterioration of the pulse-driven switching speed of a semiconductor laser, thus permitting a high-speed switching operation. For example, when the current of a semiconductor laser is changed from null or a low injection state to a high injection state to produce oscillated wavelength $\lambda_1$, the oscillated wavelength of $\lambda_1$ is maintained under the hysteresis effect even upon a slight change in the quantity of the injected current (relaxation oscillation). Even if relaxation oscillation takes place in terms of the light intensity, therefore, the change in the intensity accompanied by the relaxation oscillation can be eliminated by transmitting through the above-mentioned light transmitting medium. The switching time of the optical functional device is limited by only the rising time of the semiconductor laser, thus permitting achievement of a high-speed switching operation.

The optical functional device may be arranged in a resonator of a semiconductor laser beam emitting device, for example. In this case, the laser beam is repeatedly reflected in the resonator and is absorbed by the light transmitting medium every reflection. This enables an lengthening of an effective length of the light transmitting medium and the formation of the light transmitting medium of a thin film, thus permitting downsizing of the optical functional device. In the optical functional device, furthermore, a multistage connection is possible. A conceivable method for this multistage connection would be proposed in which a light-receiving device such as a phototransistor or a photodiode is connected to the optical functional device. The light-receiving device would receive a light signal from the preceding stage, so that the output current therefrom can be used for the injection current for the light emitting device and the multistage connection is realized.

The optical functional device makes it possible to achieve an optical memory. The optical memory enables the formation of any of the switch-off type (low light intensity state) and the switch-on type (high light intensity state) relative to the controlling input by selecting light wavelength. When switching the optical functional device, there is no harm of relaxation oscillation, permitting a high-speed operation.

The optical controlling and functional devices of the present invention may be referred to as Optical logic devices by red-shift of diode laser and inverter of optical nonlinear absorption: ORION.

EXAMPLE 1

In FIG. 1, a rod having a size of 3 mm×3 mm composed of yllrium-aluminum-garnet (YAG), with erbium ($Er^{3+}$) added therein, was employed as a light transmitting medium (10). The Er concentration was 50 atomic-percentage.

A semiconductor laser device (11) as a light emitting device was driven by a drive control circuit (12) and a temperature adjuster (13) to generate a laser beam having a constant wavelength, which was irradiated into the light transmitting medium (10) composed of the Er:YAG through a beam splitter (14) and a condenser lens (15).

Figure 2:
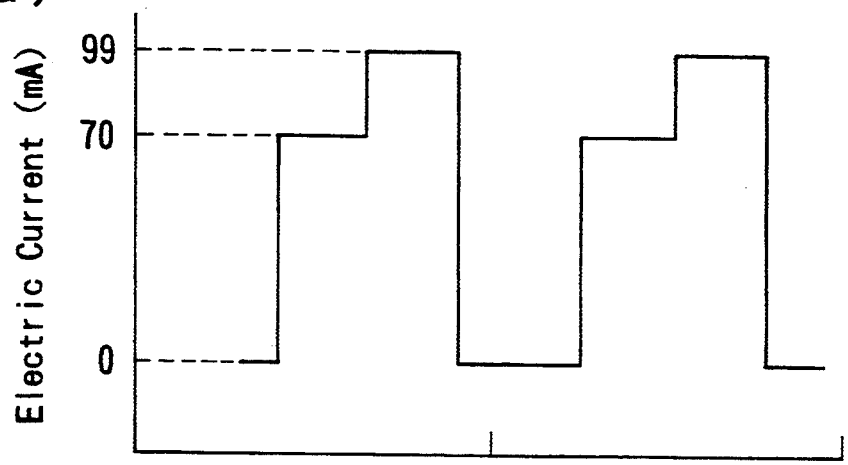
FIGS. 2a, 2b and 2c are respectively correlation diagrams illustrating the electric current injected to a semiconductor laser device, the light intensity of the output light of the semiconductor laser device, and the optical intensity after transmission through a light transmitting medium.
Figure 2:
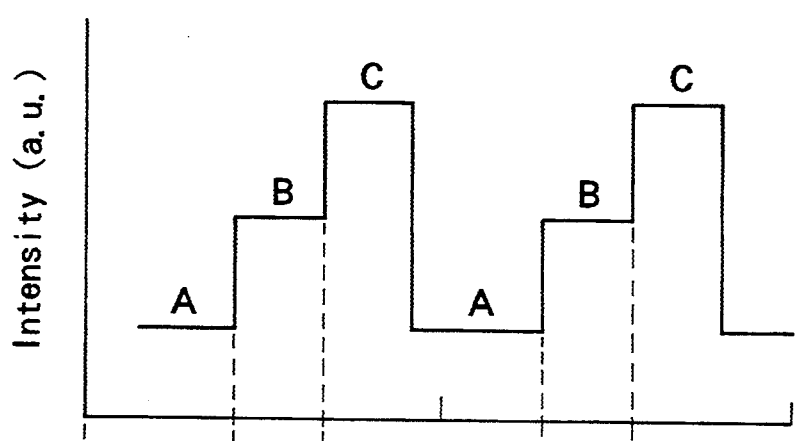
Figure 2:
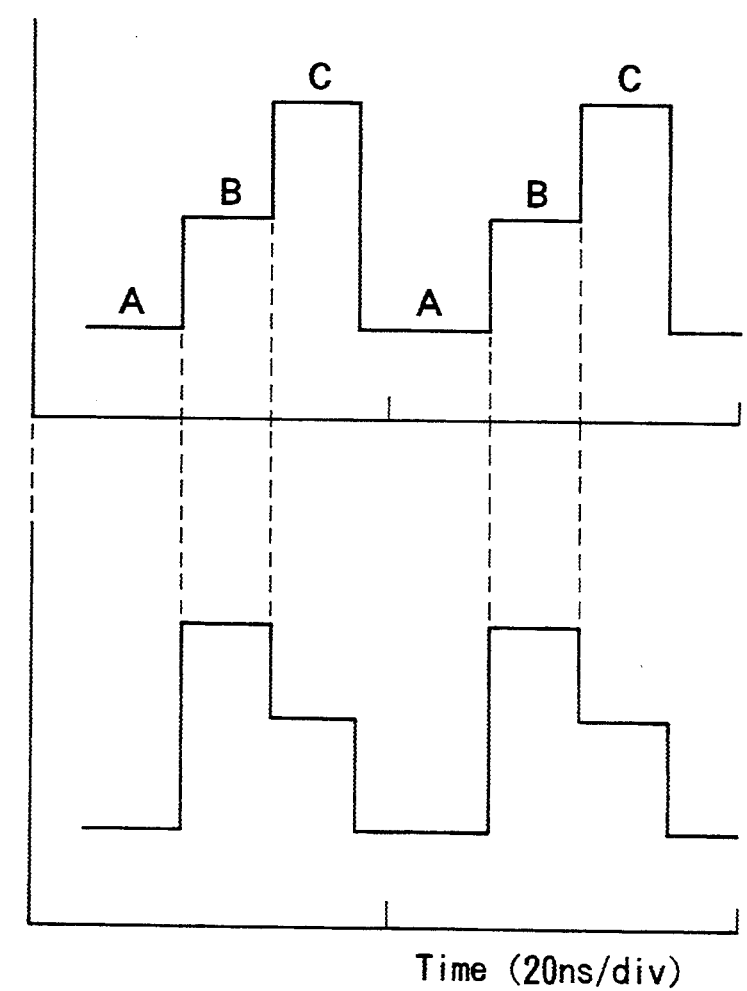
Figure 3:
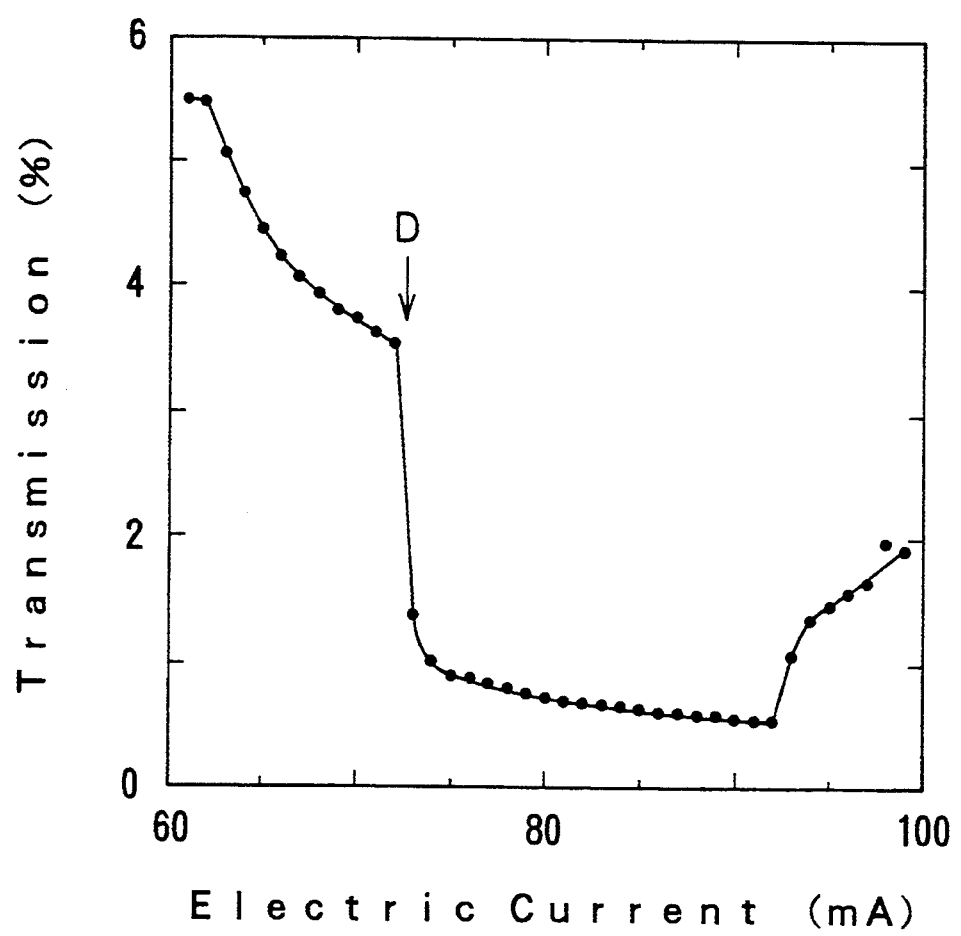
FIG. 3 is a correlation diagram between the injected current to the semiconductor laser device and the light transmittance.

The light output through the light transmitting medium (10) was received by a light detecting device (16) and was observed by means of a digital oscilloscope (17) and a light power meter (18). The results are shown in FIGS. 2 and 3.

Comparison of FIGS. 2b and 2c reveals that the values of light intensity B and C of the output from the semiconductor laser device (11) which are shown in FIG. 2b were reversed, as shown in FIG. 2c, after transmitting through the light transmitting medium (10). This phenomenon can be also confirmed in FIG. 3. At the point D of FIG. 3, the transmittance considerably decreases to about a third.

Figure 4:
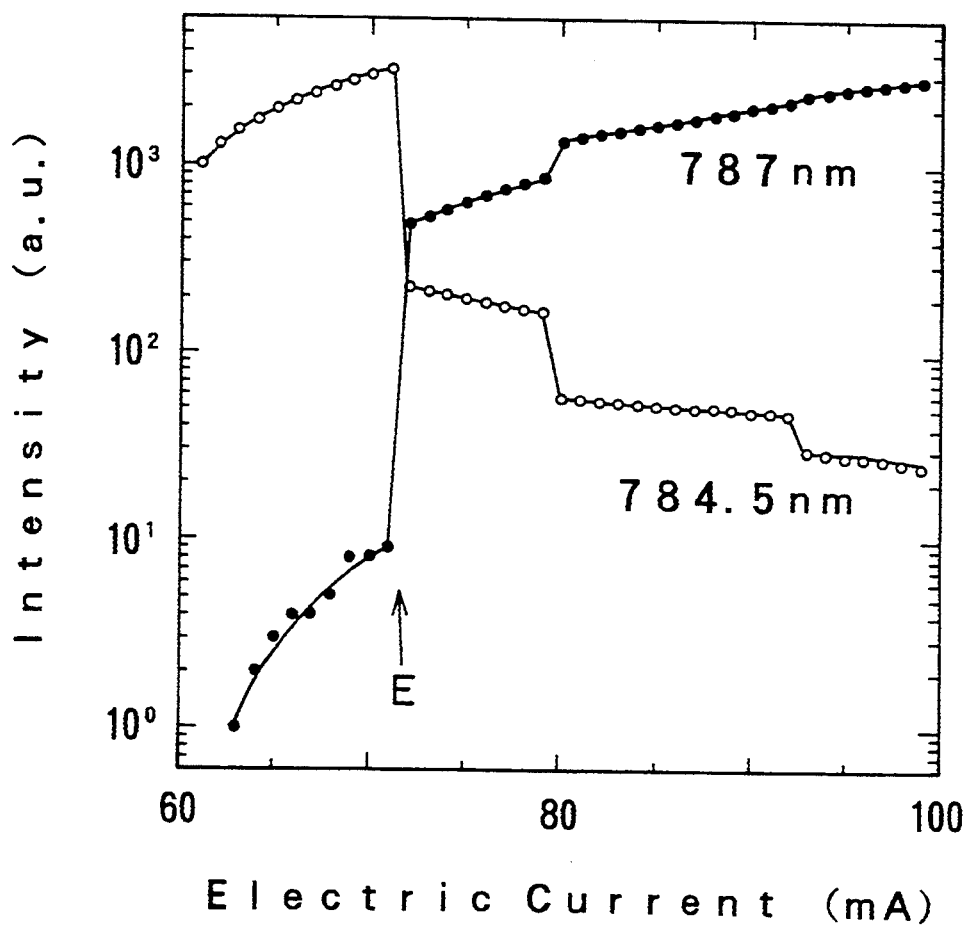
FIG. 4 is a correlation diagram between the injected current to the semiconductor laser device and the light intensity.
Figure 5:
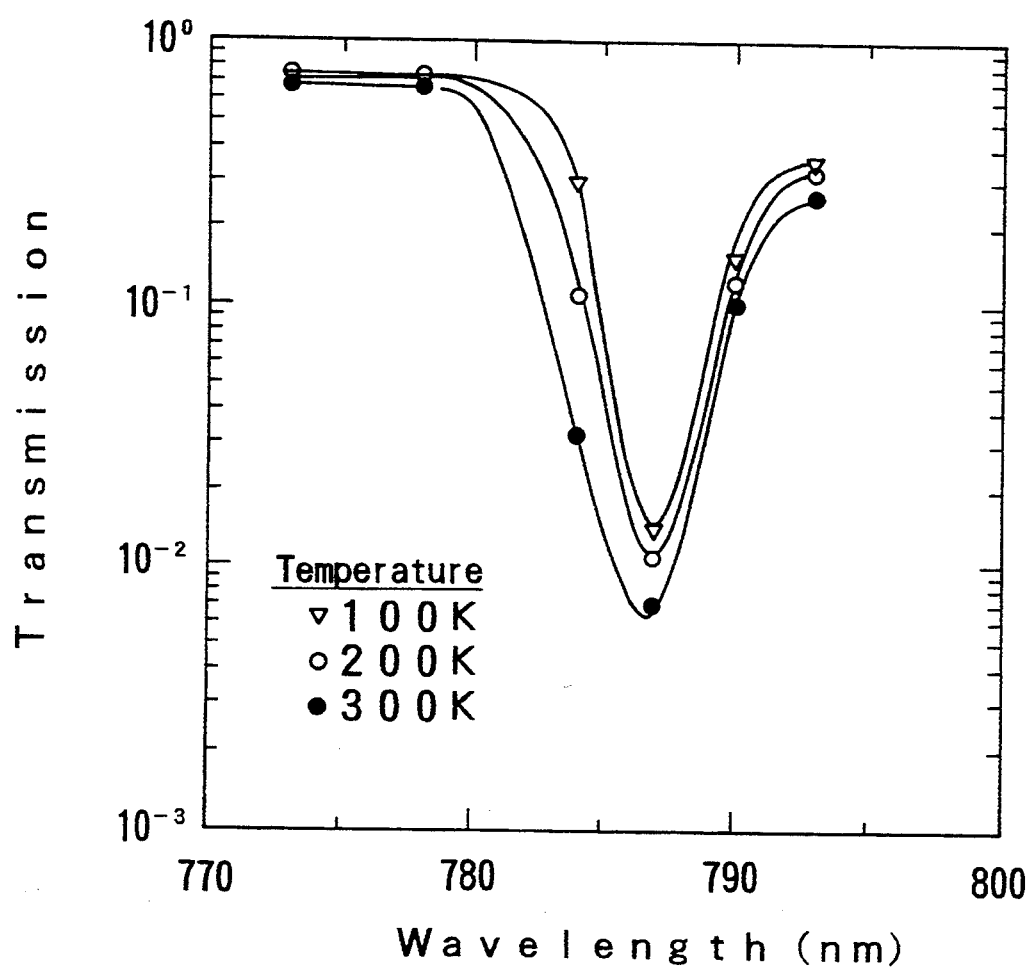
FIG. 5 is a diagram of the light absorption spectrum of the light transmitting medium.

Using a spectroscope (19) shown in FIG. 1, changes of wavelength of the laser output relative to the injected current of the semiconductor laser device (11) were measured. The results are shown in FIG. 4. In FIG. 4, the black circles represent values of light detection intensity when wavelength of the spectroscope (19) was set at 787 nm, and the white circles represent those observed when wavelength was set at 784.5 nm. At the point E (73 mA) in FIG. 4, the light intensity of 784.5 nm sharply decreases while the light intensity of 787 nm considerably increases. This suggests that, as a result of increase of the injected current to the semiconductor laser device (11), the center oscillated wavelength discontinuously changed at the point E from 784.5 nm to 787 nm. The value of the injected current at this discontinuous point E corresponds with the value of injected current at the point D of FIG. 3. As is clear from FIG. 5, furthermore, the absorption peak for the light transmitting medium (10) was at 787 nm, this corresponding with the excited absorption ($^2H_{11/2}$-$^4I_{13/2}$) of $Er^{3+}$ in Er:YAG.

As is evident from the results as described above, the phenomenon shown in FIG. 2, in which the light output is reversed by transmission through the Er:YAG light transmitting medium (10), is easily understood.

EXAMPLE 2

Figure 6:
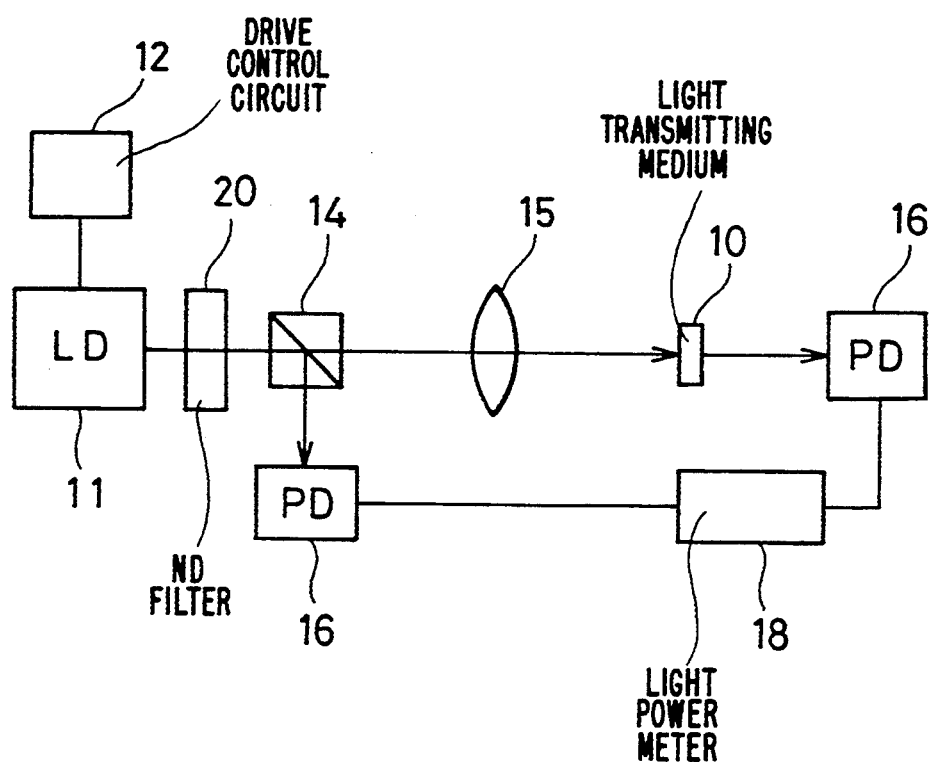
FIG. 6 is a block diagram illustrating another embodiment of the optical controlling device and the device for measuring its functions.

In FIG. 6, a $\phi 3$ mm×25 mm Er:YAG rod was employed as a light transmitting medium (10), having an Er concentration of 16 atomic-percentage.

A semiconductor laser device (11) as a light emitting device was driven by a drive control circuit (12) to produce a laser beam of a center wavelength of 787 nm, which was irradiated into the Er:YAG light transmitting medium (10) through a beam splitter (14) and a condenser lens (15). This laser beam was received by a light detecting device (16), and the light intensity was measured by an optical power meter (18) to calculate the transmittance. The results are shown in FIG. 7.

The injected current to the semiconductor laser device (11) was constantly set at 99 mA, and the laser beam intensity was varied through an automatic rotary ND (neutral density) filter (20).

Figure 7:
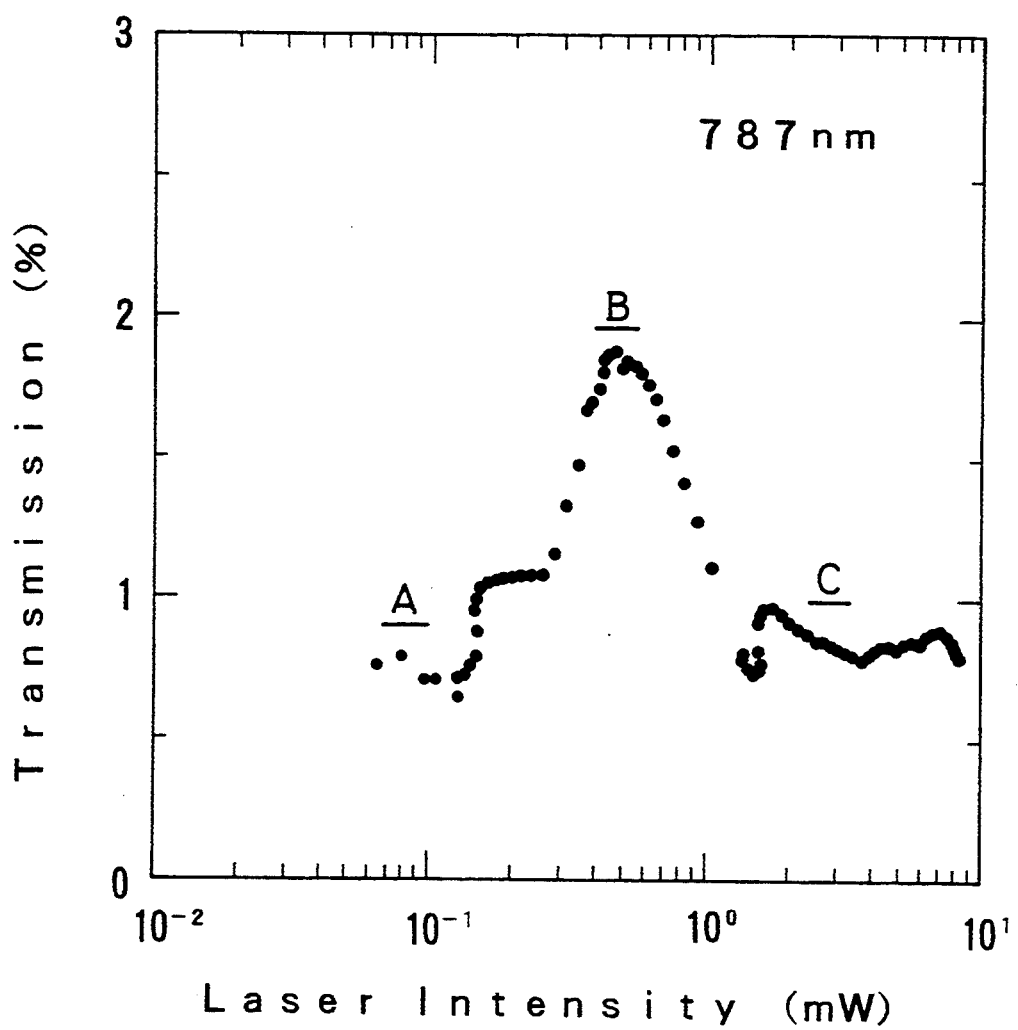
FIG. 7 is a correlation diagram between the laser intensity and the transmittance.

FIG. 7 demonstrates that the value of transmittance at the point B is about twice as high as those at the points A and C. It is thus confirmed that the change of the laser beam intensity from at the point A to at the point B brings about a high transmittance state (light switch-on), and the one from at the point B to at the point C brings about a low transmittance state (light switch-off).

It is also confirmed that the effect in which the transmittance decrease (from the point B to the point C) against the increase of the light intensity improves the on/off ratio of the inverter shown in Example 1.

EXAMPLE 3

Figure 8:
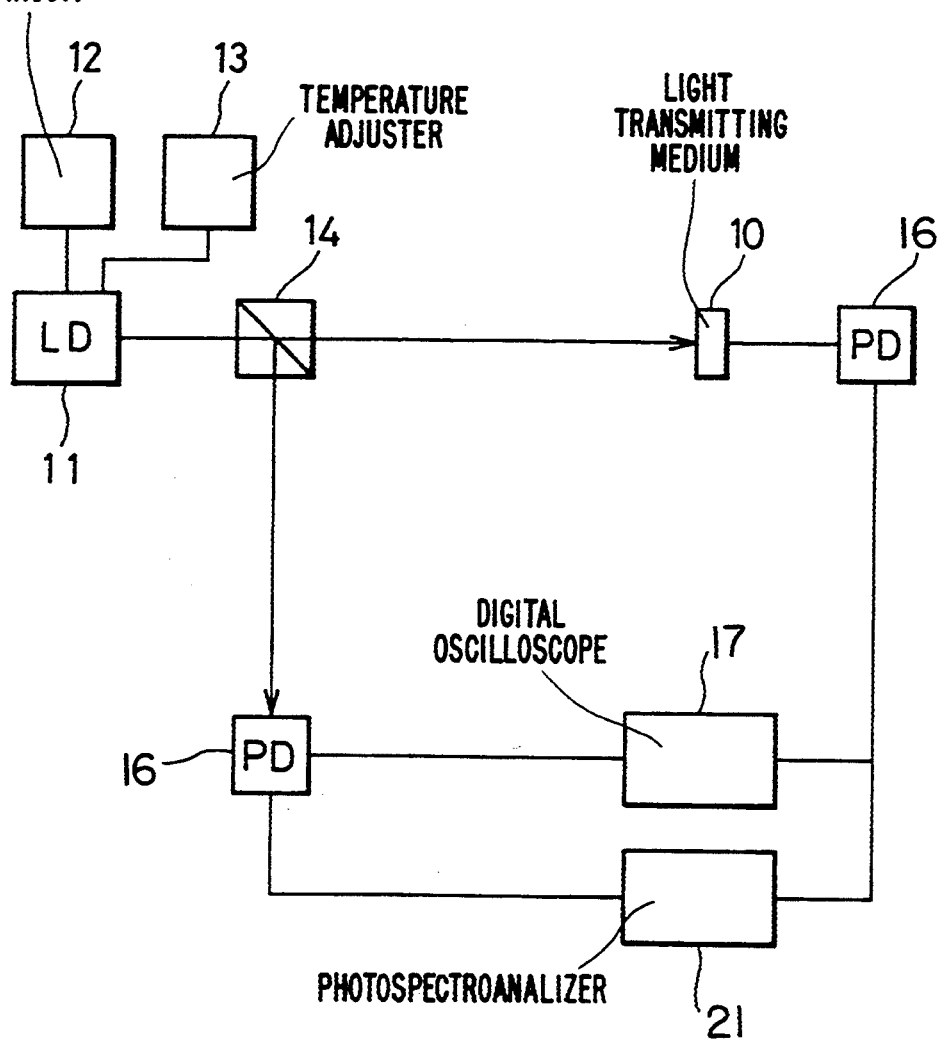
FIG. 8 is a block diagram illustrating an embodiment of the optical functional device and the device for measuring its functions.

In FIG. 8, a rod having a size of $\phi 3$ mm×3 mm composed of yttrium-aluminum-garnet (YAG) doped erbium ($Er^{3+}$) was employed as a light transmitting medium (10). A concentration of Er was set at 50 atomic-percentage, i.e., a composition of $(Er_{0.5}Y_{0.5})_3Al_5O_{12}$.

A semiconductor laser device (11) as a light emitting device was driven by a drive control circuit (12) and a temperature adjuster (13) to generate a laser beam of a constant wavelength, which was irradiated into the light transmitting medium (10) of Er:YAG through a beam splitter (14).

The output light transmitting through the light transmitting medium (10) was received by a light detecting device (16) and was observed by means of a digital oscilloscope (17) and an photospectroanalyzer (21). The laser head was heated and constantly kept at 33° C. by the temperature adjuster (13). The results are shown in FIG. 9.

Comparison of FIGS. 9b and 9c reveals that a change of the light intensity of the output from the semiconductor laser device (11) of FIG. 9b is reversed (a low light intensity state) after transmitting through the light transmitting medium (10) and plays a role of a memory function of maintaining the low light intensity state.

Figure 10:
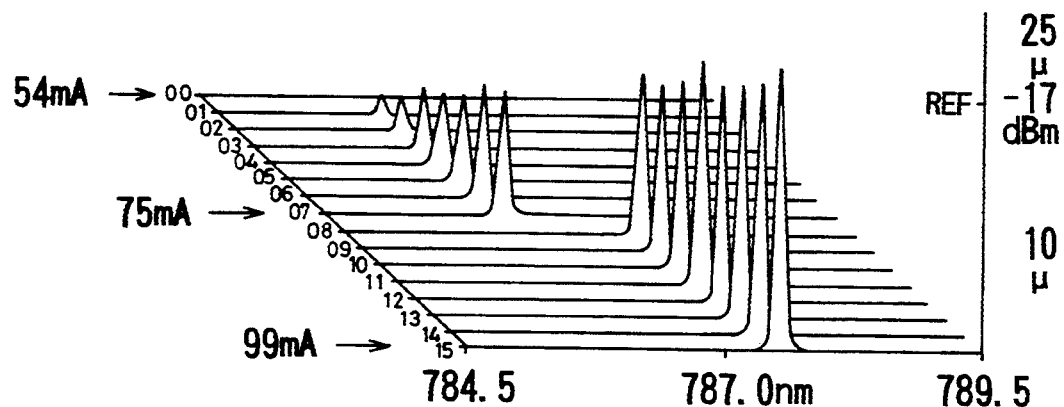
FIGS. 10a and 10b are respectively correlation diagrams between light wavelength and intensity when increasing the injected current.
Figure 10:
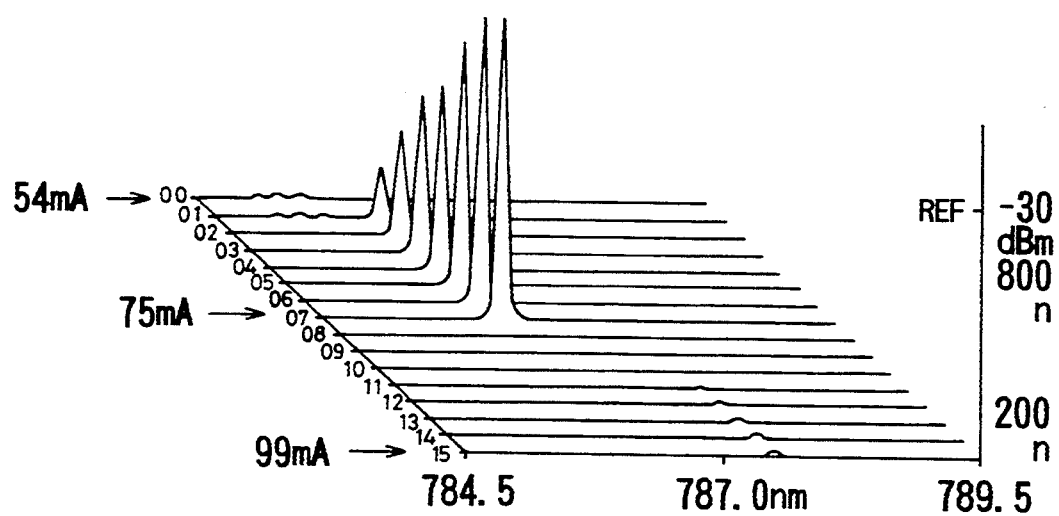

This phenomenon is also confirmed in FIGS. 10 and 11. FIG. 10a illustrates a relationship between light wavelength and intensity which was detected by a photospectroanalyzer (21) in the case where the current injected to the semiconductor laser device (11) was increased from 54 mA to 99 mA at intervals of 3 mA. FIG. 10b represents the results of the detection by the photospectroanalyzer (21) after transmission through the light transmitting medium (10). FIG. 11a shows a relationship between light wavelength and intensity which was detected by a photospectroanalyzer (21) in the case where the current injected to the semiconductor laser device (11) was decreased from 99 mA to 54 mA at intervals of 3 mA. FIG. 11b represents the results of the detection after transmission through the light transmitting medium (10).

It is understood in FIG. 10a that, as the injected current increases, light wavelength is discontinuously changed from 786.1 nm to 787.5 nm at the injected current of 78 mA. FIG. 11a suggests that, as the injected current decreases, light wavelength is discontinuously changed from 787.5 nm to 786.1 nm at 60 mA. From these FIGS. 10a and 11a, it is confirmed that there is hysteresis against the injected current in changes of light wavelength. FIGS. 10b and 11b reveal that the laser beam of 787.5 nm after transmitting through the light transmitting medium (10) is absorbed by the light transmitting medium (10).

In FIGS. 10b and 11b, furthermore, comparison of the cases of the injected current of 75 mA demonstrates that, while a strong light intensity is observed in FIG. 10b, FIG. 11b shows a light intensity of almost null.

· As shown in FIG. 8, therefore, when the controlled injected currents 75 mA (low-carrier injection) and 99 mA (high-carrier injection) are entered in the semiconductor laser device (11), the light output (FIG. 9b) is irradiated into the light transmitting medium (10), and the resultant transmitting light is observed, it is confirmed that the light intensity output having a memory function as shown in FIG. 9c is obtained. Because of the presence of hysteresis in the light wavelength change against the injected current, if light wavelength is changed by shifting from the low-carrier injection state to the high-carrier injection, light wavelength maintains the high-carrier injection state even after resuming to the low-carrier injection state. Thus, transmission of this laser beam through the light transmitting medium enables the achievement of a memory function of holding the low-intensity state.

Figure 12:
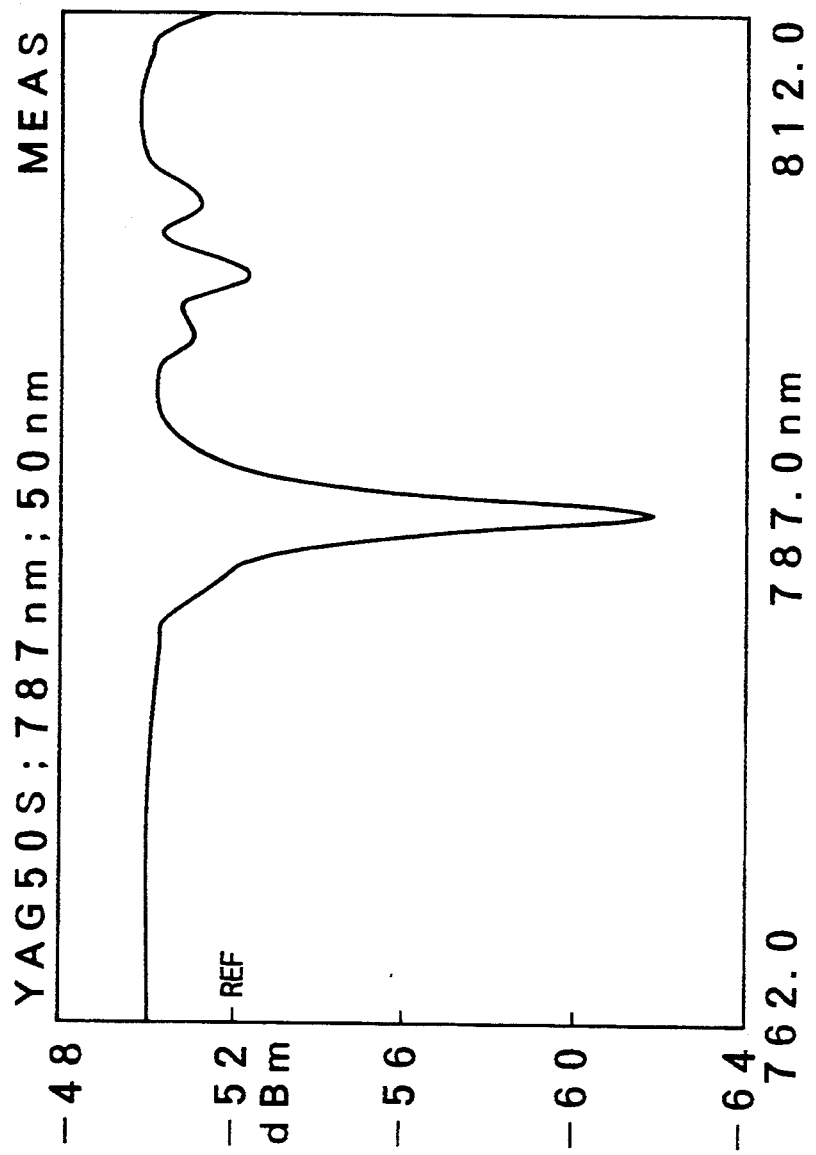
FIG. 12 is a diagram of the light absorption spectrum of the light transmitting medium.

FIG. 12 shows a light absorption spectrum of the above-mentioned Er:YAG. In FIG. 12, the absorption peak is at 787.3 nm, and this corresponds with the excited absorption ($^2H_{11/2}$–$^4I_{13/2}$) of $Er^{3+}$ of Er:YAG.

EXAMPLE 4

The laser head temperature was constantly kept at 43° C. using the same semiconductor laser device as in Example 3. Oscillated wavelengths of 787.5 nm and 789.6 nm were respectively observed at the injected currents of 75 mA and 99 mA. As is clear from the comparison of FIGS. 13b and 13c, the light intensity plays a role of a memory which maintains the high light intensity state.

Figure 14:
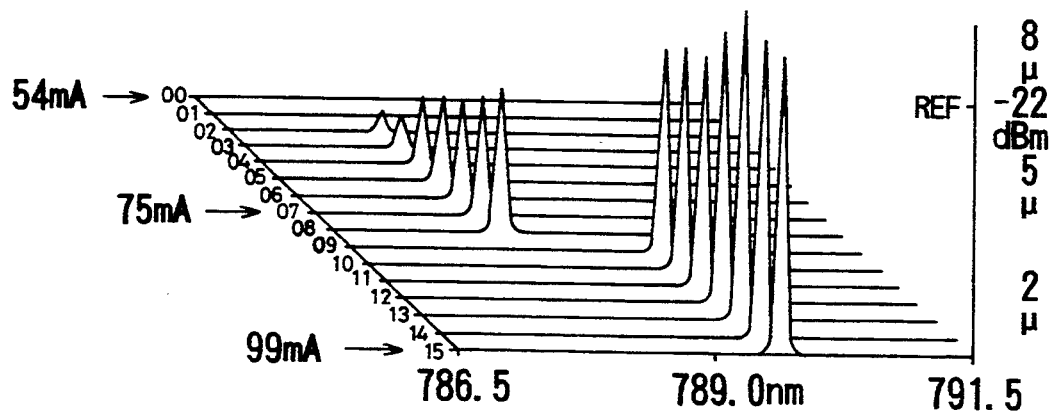
FIGS. 14a and 14b are respectively correlation diagrams between light wavelength and intensity when increasing the injected current, respectively.
Figure 14:
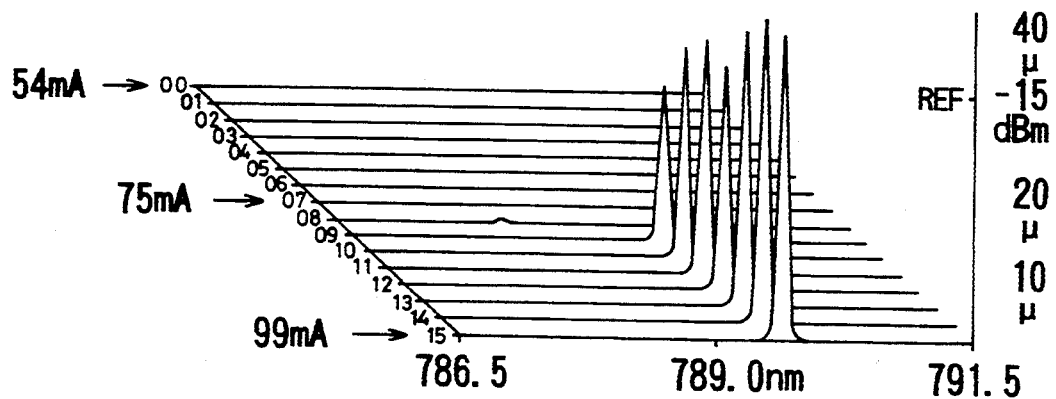

FIGS. 14 and 15 illustrate the results of the measurement by the photospectroanalyzer (21) of FIG. 8. FIG. 14a shows the results obtained by increasing the injected current from 54 mA to 99 mA at intervals of 3 mA, and FIG. 14b shows those obtained after transmission through the light transmitting medium (10). FIG. 15a, on the other hand, represents the results obtained by decreasing the injected current from 99 mA to 54 mA at intervals of 3 mA, and FIG. 15b represents the results obtained after transmission through the light transmitting medium (10).

FIG. 14a suggests that light wavelength discontinuously changes from 787.5 nm to 789.6 nm at 81 mA. It is also understood from FIG. 15a that light wavelength discontinuously changes at 69 mA. These FIGS. 14a and 15a suggests the presence of hysteresis in changes of light wavelength against the injected current. FIGS. 14b and 15b demonstrate that the light having wavelength of 787.5 nm is absorbed by the light transmitting medium (10), and the light of 789.6 nm transmitts through the medium.

Figure 13:
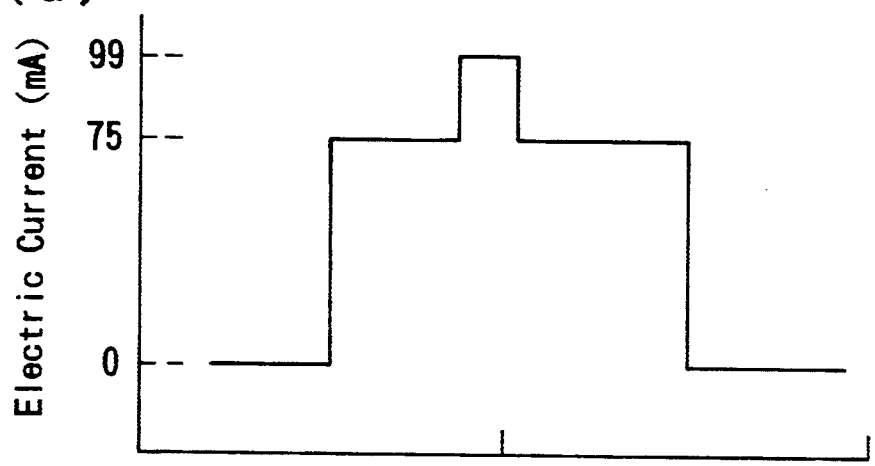
FIGS. 13a, 13b and 13c are respectively correlation diagrams illustrating the injected current to the semiconductor laser device, the light intensity of the output light, and the light intensity after transmission through the light transmitting medium.
Figure 13:
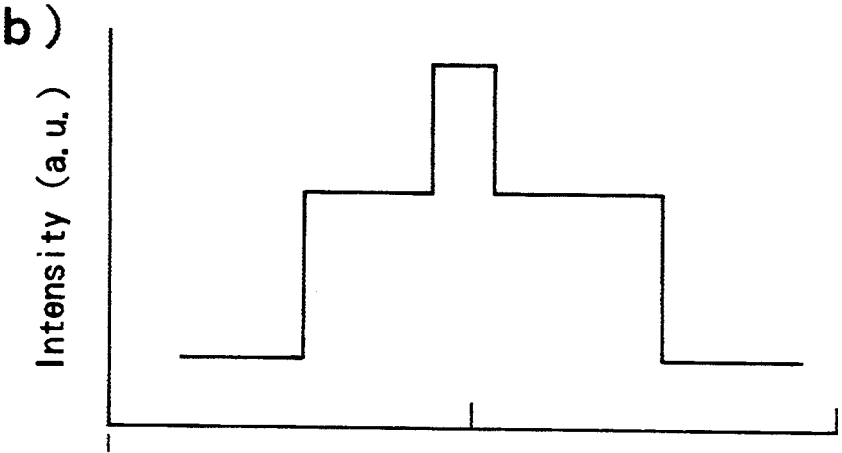
Figure 13:
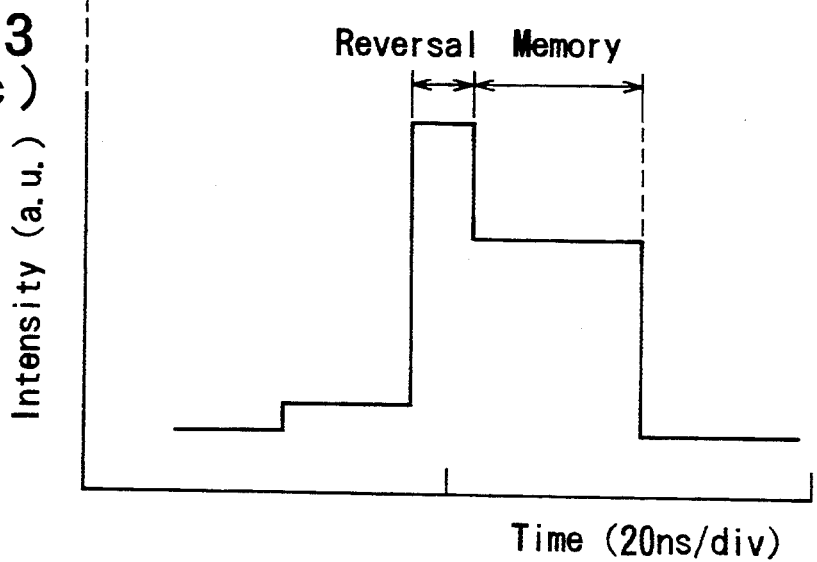

As shown in FIG. 13a, therefore, when the controlling inputs for the injected currents at 75 mA (low-carrier injection) and 99 mA (high-carrier injection) are entered into the semiconductor laser device (11), the light output (FIG. 13b) is irradiated into the light transmitting medium (10), and the transmitting light is observed, a memory function which maintains a high-intensity state of FIG. 13a is obtained.

As is clear from the results described in the above, a memory function of holding the respective state of a low light intensity and a high light intensity can be easily achieved by transmission of a light output through the Er:YAG light transmitting medium.

EXAMPLE 5

Figure 16:
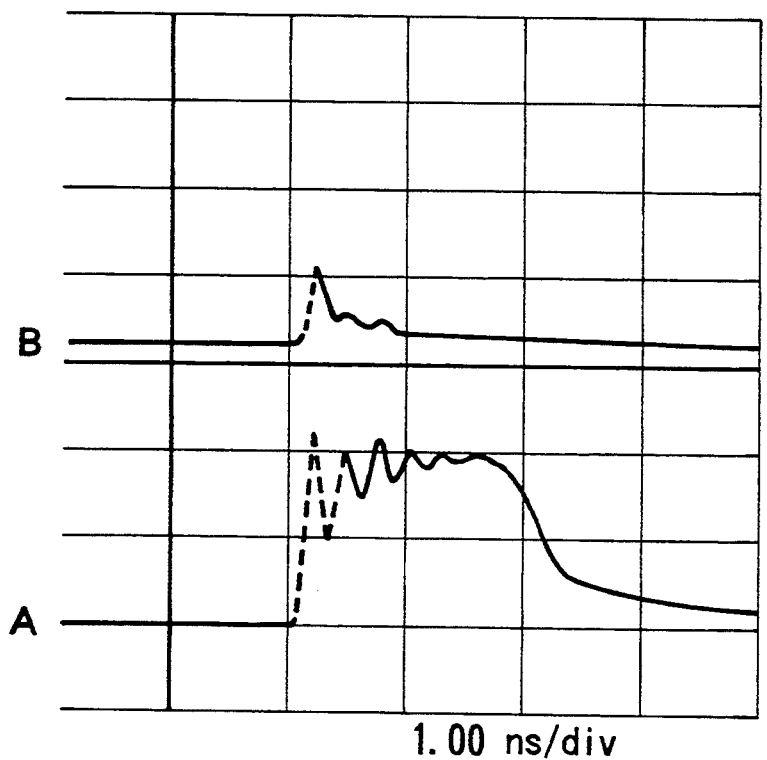
FIG. 16 illustrates output waveforms of single-shaped pulses.

A of FIG. 16 shows an input waveform obtained in the case where oscillated wavelength was set so as to obtain about 787.5 nm for the injected current of 99 mA and a single-shaped pulse of 99 mA was formed. Relaxation oscillation inherent to a laser is observed. B of FIG. 16 represents a light waveform after transmission through the Er:YAG light transmitting medium. It should particularly be noted that the second and subsequent peaks of the relaxation oscillation are suppressed in B of FIG. 16. This means that, when oscillated wavelength reaches a constant wavelength, for example, $\lambda_1$ (787.5 nm), in the initial build up, the light wavelength of $\lambda_1$ is maintained by hysteresis effect even though the relaxation oscillation brings about a change of intensity, and that the light is absorbed after transmission through the light transmitting medium. Relaxation oscillation is suppressed, and a high-speed operation is available in the switching time of almost only a build up period. In this Example, the switching time was about 100 ps.

Figure 17:
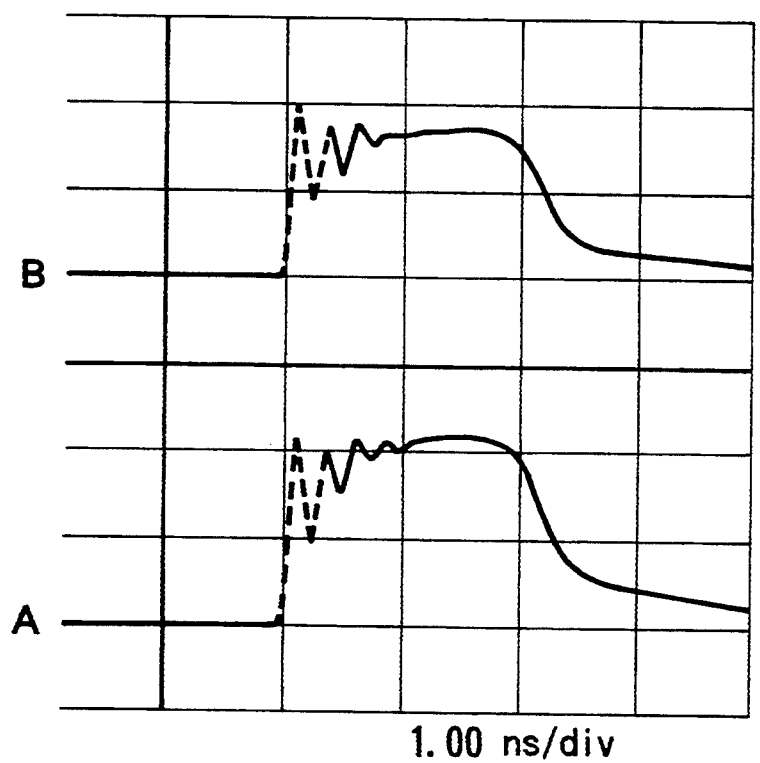
FIG. 17 illustrates other output waveforms of single-shaped pulses.

For a comparison, A and B of FIG. 17 respectively illustrate a single-shaped pulse input waveform at 99 mA obtained by adjusting the laser head temperature and setting light wavelength of 786 nm (not $\lambda_1$), and an output waveform after transmission through the light transmitting medium. It is confirmed from B of FIG. 17 that the input light of A transmitts through the medium with almost no absorption and is injured under relaxation oscillation effect.

In Examples in the above, $Er^{3+}$ is used as a rare earth element to be doped in the light transmitting medium, but the present invention is not limited to this. Any appropriate material may be selected in accordance with light wavelength and the kind of the light transmitting medium. Any kind of light emitting device may be also appropriately employed.

What is claimed is:

1. An optical controlling device comprising a light transmitting medium showing a low transmittance for specific light wavelength $\lambda_1$ and a high transmittance for light wavelength $\lambda_2$ around said wavelength $\lambda_1$, and a light emitting device emitting a light having wavelength $\lambda_1$ or $\lambda_2$, wherein said optical controlling device controls light intensity in accordance with the emitted light having wavelength $\lambda_1$ or $\lambda_2$ through irradiation from said light emitting device and transmission of the emitted light through said light transmitting medium,
    wherein said light emitting device is a semiconductor laser, said semiconductor laser respectively emitting wavelengths $\lambda_2$ and $\lambda_1$ at a low-current and a high-current injections, or respectively emitting wavelengths $\lambda_1$ and $\lambda_2$ at a low-current and a high-current injections.

2. A controlling device as claimed in claim 1, wherein said light emitting device is an absorption-saturated type semiconductor laser.

3. An optical controlling device comprising a light transmitting medium showing a low transmittance for specific light wavelength $\lambda_1$ and a high transmittance for light wavelength $\lambda_2$ around said wavelength $\lambda_1$, and a light emitting device emitting a light having wavelength $\lambda_1$ or $\lambda_2$, wherein said optical controlling device controls light intensity in accordance with the emitted light having wavelength $\lambda_1$ or $\lambda_2$ through irradiation from said light emitting device and transmission of the emitted light through said light transmitting medium,
    wherein said light transmitting medium comprises a substance selected from the group consisting of transparent ceramics, a glass, a semiconductor and an insulator, said substance having added thereto at least one rare earth element,
    wherein said at least one rare earth element is erbium, $Er^{3+}$,
    wherein said light wavelength $\lambda_1$ for which said light transmitting medium has a low transmittance is near an excited absorption peak ($^2H_{11/2}$–$^4I_{13/2}$) of erbium, $Er^{3+}$.

4. An optical controlling device comprising a light transmitting medium showing a low transmittance for specific light wavelength $\lambda_1$ and a high transmittance for light wavelength $\lambda_2$ around said wavelength $\lambda_1$, and a light emitting device emitting a light having wavelength $\lambda_1$ or $\lambda_2$, wherein said optical controlling device controls light intensity in accordance with the emitted light having wavelength $\lambda_1$ or $\lambda_2$ through irradiation from said light emitting device and transmission of the emitted light through said light transmitting medium,
wherein said light transmitting medium comprises a substance selected from the group consisting of transparent ceramics, a glass, a semiconductor and an insulator, said substance having added thereto at least one rare earth element,
wherein said at least one rare earth element is erbium, $Er^{3+}$,
wherein said light transmitting medium is composed of transparent ceramics of YAG (yttrium-aluminum-garnet) with added erbium, $Er^{3+}$,
wherein said light wavelength $\lambda_1$ for which said light transmitting medium has a low transmittance is near an excited absorption peak ($^2H_{11/2}$–$^4I_{13/2}$) of erbium, $Er^{3+}$.

5. An optical functional device comprising a light transmitting medium showing a low transmittance for specific light wavelength $\lambda_1$ and high transmittance for light wavelengths $\lambda_2$ and $\lambda_3$ around said wavelength $\lambda_1$ ($\lambda_2 < \lambda_1 < \lambda_3$), and a light emitting device changing wavelength while accompanying a generation of hysteresis dependent upon the quantity of current injection or light irradiation, and emitting a light having light wavelength $\lambda_1$, $\lambda_2$ or $\lambda_3$ wherein a light of wavelength $\lambda_1$, $\lambda_2$ or $\lambda_3$ is irradiated from said light emitting device to said light transmitting medium, the intensity of said light transmitting through said light transmitting medium is maintained at a low or high state under the effect of said hysteresis, thereby a memory function is obtained.

6. A functional device as claimed in claim 5, wherein said light emitting device is a semiconductor laser which permits carrier injection to an excited area by means of a current or a light, changes a light wavelength from $\lambda_2$ to $\lambda_1$ when shifting from a low-carrier injection to a high-carrier injection, maintains said light wavelength of $\lambda_1$ by hysteresis when said low-carrier injection is resumed, and keeps a light intensity transmitting through said light transmitting medium at a low-intensity state, said semiconductor laser further changing light wavelength from $\lambda_1$ to $\lambda_3$ when shifting from a low-carrier injection to a high-carrier injection, maintains said light wavelength of $\lambda_3$ by hysteresis when said low-carrier injection is resumed, and keeping a light intensity transmitting through said light transmitting medium at a high-intensity state.

7. A functional device as claimed in claim 6, wherein said light transmitting medium comprises a substance selected from the group consisting of transparent ceramics, a glass, a semiconductor and an insulator, said substance being added with at least one rare earth element.

8. A functional device as claimed in claim 7, wherein said at least one rare earth element is erbium, $Er^{3+}$.

9. A functional device as claimed in claim 8, wherein said light transmitting medium is composed of transparent ceramics of YAG (yttrium-aluminium-garnet) with added erbium, $Er^{3+}$.

10. A functional device as claimed in claim 9, wherein said light wavelength $\lambda_1$ for which said light transmitting medium has a low transmittance is near an excited absorption peak ($^2H_{11/2}$–$^4I_{13/2}$) of erbium $Er^{3+}$.

11. A functional device as claimed in claim 8, wherein said light wavelength $\lambda_1$ for which said light transmitting medium has a low transmittance is near an excited absorption peak ($^2H_{11/2}$–$^4I_{13/2}$) of erbium $Er^{3+}$.

12. A functional device as claimed in claim 5, wherein said light transmitting medium comprises a substance selected from the group consisting of transparent ceramics, a glass, a semiconductor and an insulator, said substance being added with at least one rare earth element.

13. A functional device as claimed in claim 12, wherein said at least one rare earth element is erbium, $Er^{3+}$.

14. A functional device as claimed in claim 13, wherein said light transmitting medium is composed of transparent ceramics of YAG(yttrium-aluminum-garnet) with added erbium, $Er^{3+}$.

15. A functional device as claimed in claim 14, wherein said light wavelength $\lambda_1$ for which said light transmitting medium has a low transmittance is near an excited absorption peak ($^2H_{11/2}$–$^4I_{13/2}$) of erbium $Er^{3+}$.

16. A functional device as claimed in claim 13, wherein said light wavelength $\lambda_1$ for which said light transmitting medium has a low transmittance is near and excited absorption peak ($^2H_{11/2}$–$^4I_{13/2}$) of erbium $Er^{3+}$.

17. A functional device as claimed in claim 5, wherein said functional device suppresses variations of a light intensity caused by relaxation oscillation during a laser oscillation.

18. A functional device as claimed in claim 5, wherein said light transmitting medium is provided in a resonator of a semiconductor laser beam emitting device, and a light-receiving device is connected, thereby said functional device is downsized and has a multistage connection structure.

* * * * *